Sept. 8, 1970      A. T. CRANE      3,527,107
PNEUMATIC SPEED TRANSDUCER SYSTEM
Filed Nov. 1, 1967      2 Sheets-Sheet 1

INVENTOR.
Arthur T. Crane
BY
George E. Johnson
ATTORNEY

Sept. 8, 1970   A. T. CRANE   3,527,107
PNEUMATIC SPEED TRANSDUCER SYSTEM

Filed Nov. 1, 1967   2 Sheets-Sheet 2

INVENTOR.
Arthur T. Crane
BY
George B. Johnson
ATTORNEY

United States Patent Office 3,527,107
Patented Sept. 8, 1970

3,527,107
PNEUMATIC SPEED TRANSDUCER SYSTEM
Arthur T. Crane, Burt, Mich., assignor to General Motors Corporation, Detroit, Mich., a corporation of Delaware
Filed Nov. 1, 1967, Ser. No. 679,895
Int. Cl. G01p 3/42, 3/26
U.S. Cl. 73—519                                        2 Claims

ABSTRACT OF THE DISCLOSURE

A system for indicating revolutions of a shaft per increment of time or an expression of vehicle speed with the operation of that system being by vacuum modulated in accordance with the revolutions or the speed and without the use of centrifugal force. The vacuum is modulated by a bleed valve which has its movable member connected to a speed cup. The valve is normally open to provide a bias across the valve and a counter torque on the speed cup.

---

This invention relates to a transducer system and more particularly to a system pneumatically operative to give a revolution or speed indicator reading.

One form of speedometer commonly used on automotive vehicles is disclosed in the U.S. Pat. 2,627,401 granted Feb. 3, 1953, in the name of H. H. Harada and entitled "Speed Cup Bias Spring." In such a speedometer a shaft is driven by a flexible cable retained in a guiding conduit or sheath leading to the transmission. The shaft rotates a U-shaped permanent magnet and the latter attracts a speed cup attached to a pointer indicating miles per hour and rotating against the force of a spring. The speed cup shaft also serves to operate an odometer. The drive cable and conduit arrangements used with such installations are common and perform well but they are subject to wear and they are costly to manufacture and install.

Speed indicators also have been employed heretofore in which fluid pressure is reduced or increased in accordance with the rotational speed of a shaft and rendered effective to give a speed reading but in most instances indicators of this type utilize centrifugal force to operate their respective valve arrangement. They also inherently have a square-law response which is not desirable. If a square-law response is exhibited, then the centrifugal force will vary as the square of the number of rotations and the receiver dial must be provided with symbols in accordance with this law. A linear readout is much to be preferred as speed readings should be presented with the same degree of accuracy over the entire operating range of an indicator.

An object of the present invention is to provide an improved speed transducer capable of effecting an accurate readout uniformly over an operating range and operative pneumatically to avoid difficulties inherent in mechanical power transfer devices.

A feature of the present invention is a transducer system comprising a pressure gauge indicator operable by vacuum as modulated by a driving speed magnet and a driven drag or speed cup arrangement.

This and other important features of the invention will now be described in the specification and then pointed out more particularly in the appended claims.

Figure 1:
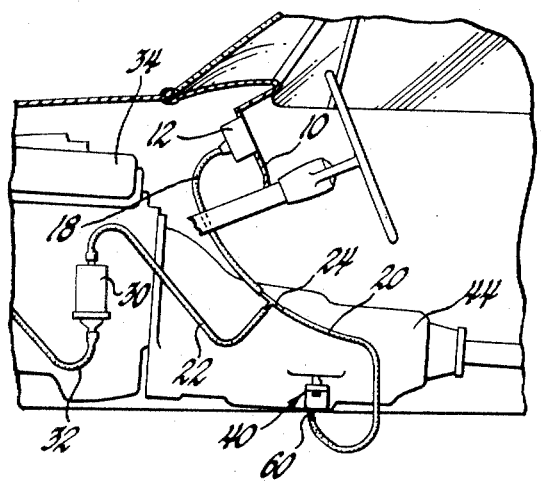
FIG. 1 is a sectional and schematic view of a portion of an automobile in which one embodiment of the present invention is installed.
Figure 2:
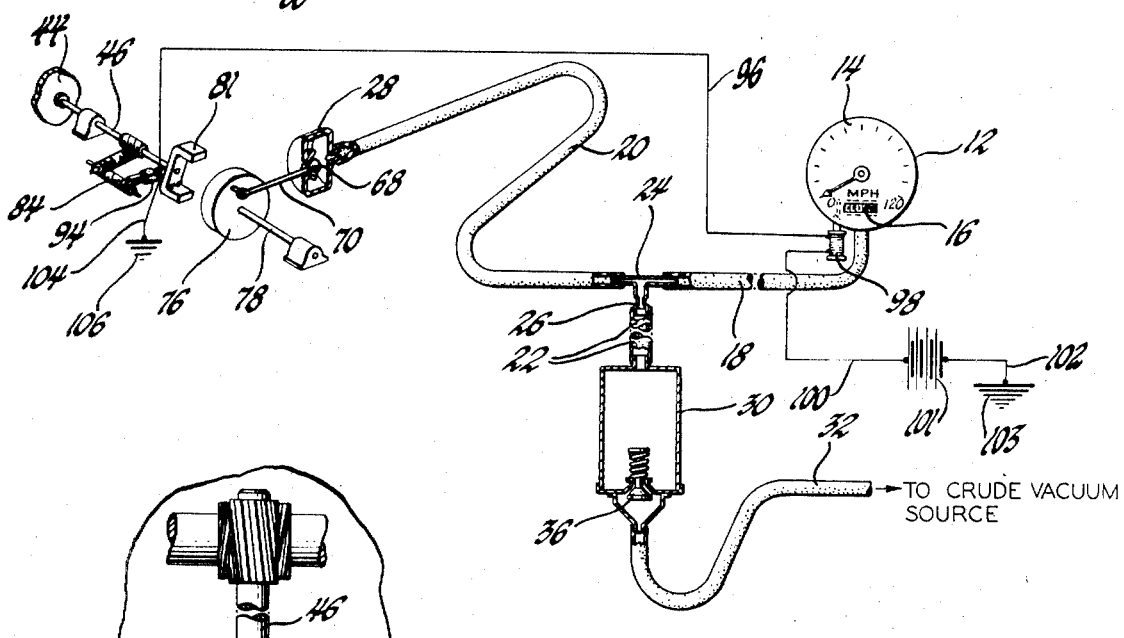
FIG. 2 is a schematic and partially perspective view of components utilized in the indicating system of FIG. 1 but with an odometer added.

In FIG. 1, an automobile dash is depicted at 10 and this dash supports a pressure gauge 12 having a dial 14 (FIG. 2) graduated to indicate miles per hour. The dial also has an aperture 16 through which an odometer reading may be observed. Three conduits 18, 20, and 22 have ends connected to separate legs of a T fitting 24 and one leg of the T fitting has a restrictor 26. The conduit 18 connects one leg of the T fitting to the gauge 12. The conduit 20 connects a second leg of the T fitting 24 to a modulator chamber 28. The conduit 22 connects the restricted leg of the fitting 24 to an accumulator 30. The latter is connected by means of a conduit 32 to the intake manifold of the engine 34. A spring biased valve 36 is mounted in the accumulator 30 in such a way that the vacuum in the accumulator will not drop below a predetermined amount when the engine is momentarily operating at high speed or accelerating.

Figure 3:
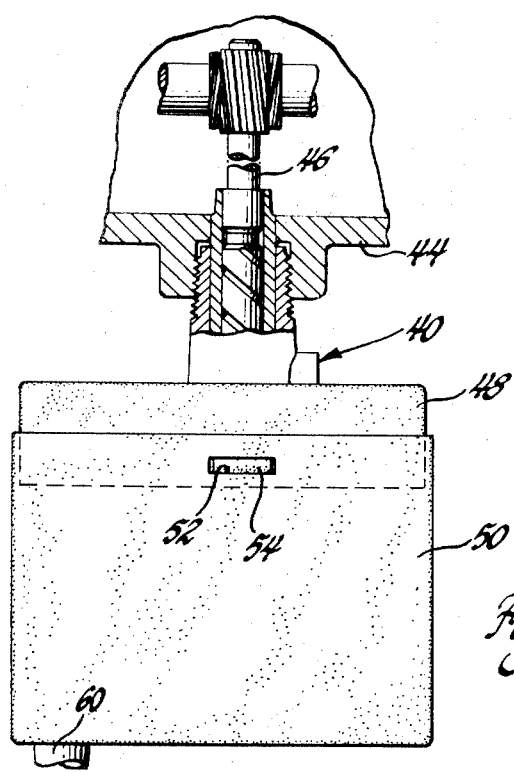
FIG. 3 is an enlarged cross sectional view of a vacuum modulator as installed on a vehicle transmission as in FIG. 1.

The modulator chamber 28 is a part of a modulator generally indicated at 40 on the casing 44 of the automobile transmission. FIG. 3 shows one gearing arrangement within the transmission casing 44 adapted to operate a shaft 46 for driving the modulator 40.

Figure 5:
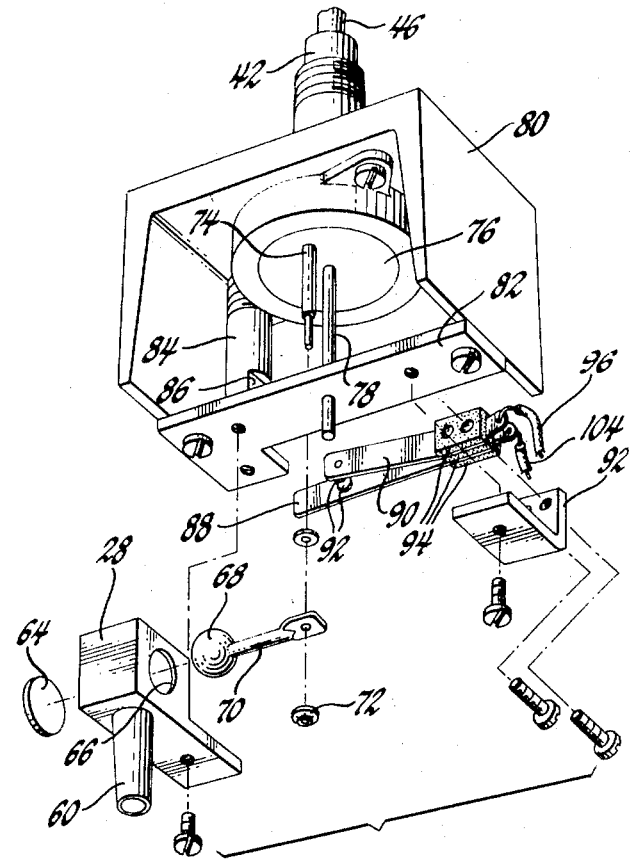
FIG. 5 is an exploded perspective view of a portion of the modulator structure of FIG. 4.
Figure 4:
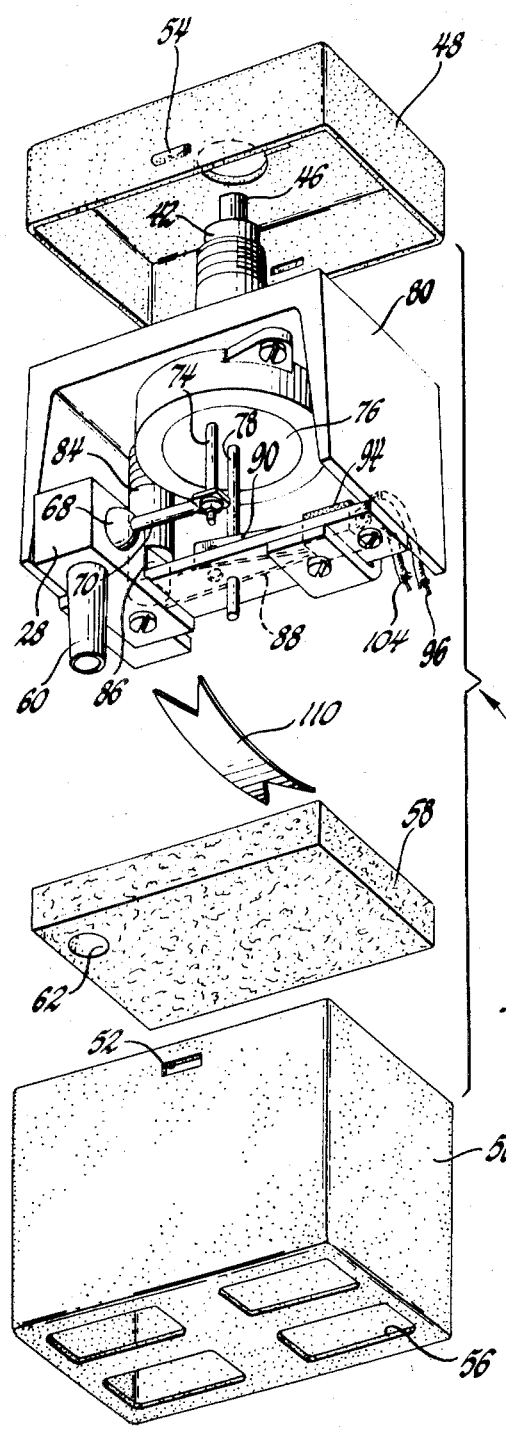
FIG. 4 is an exploded perspective view of the modulator of FIG. 3 showing interior construction.

The modulator 40 includes a casing of two parts 48 and 50 held together to form an enclosure or box by means of notches such as the notch 52 cooperating with detents such as the detent 54. The casing part 50 is apertured as at 56 to permit air to enter and pass through a filter pad 58 resting in the bottom of the box. The modulator chamber 28 is located in the modulator box and carries a nipple 60 extending through an opening 62 in the filter pad 58 as well as though one of the openings 56 of the box portion 50 and this nipple 60 is connected to one end of the conduit 20. The modulator chamber 28 has a cover 64 (FIG. 5) closing the chamber on one side and held in place by means not disclosed. The opposite side of the chamber 28 has an aperture 66 the margin of which is adapted to serve as a valve seat for a ball valve 68. The latter is integral with an arm 70 held by means of a spring washer 72 on a shaft 74. The latter is eccentrically mounted on a speed cup 76. The latter is fixed to a cup shaft 78 journaled on the end of the magnet shaft 46 and a crosspiece 82. The shaft 46 (FIG. 3) emerging from the transmission casing 44 supports a U-shaped magnet 81 (FIG. 2) for rotation within the speed cup 76 as is well known in the art. The shaft 78 is independent of the shaft 46 but gearing, not shown, is provided in the conventional manner to drive an odometer shaft 84 directly from the shaft 46. The shaft 84 has a flattened portion 86 adapted to contact an end of a spring arm 88. The latter and a second and shorter spring arm 90 bear a pair of contacts as at 92 and are mounted in insulated relation to the frame 81 by means of an L-shaped bracket 92 and three insulating blocks 94. The spring arm 90 is connected by a wire 96 to one end of a winding in a solenoid 98. The other end of the winding is connected by a line 100 to a battery 101. The other battery terminal is connected by a line 102 to ground as at 103. The spring arm 88 is connected by a wire 104 to ground as at 106. A retainer clip 110 is provided to hold the filter pad 58 in place.

Assuming that the engine 34 is operating and a uniform vacuum is maintained in the accumulator 30, the vacuum on the gauge side of the restrictor 26 will remain constant at a given maintained speed of the automobile and the speed of the vehicle will be indicated on the dial 14. If the speed of the automobile should change, however, the speed cup will rotate a small angular distance corresponding with that change in speed and modify the vacuum in the lines 18 and 20 by admitting or cutting off an air supply at the valve 68. The vacuum operating the gauge 12 will then be modified in accordance with variations in the speed of the vehicle and the gauge will indicate the new speed. The differential pressure across the valve member 68 biasses the valve in the open position. Increased vehicle speed reduces the flow area through the valve to provide an increasing differential pressure bias on the valve member and counter-torque on the speed up.

There is no difficulty in providing an odometer in combination with this type of a speed indicating system. The solenoid 98 and the contacts 92 are shown to illustrate that such a provision may be made whereby electrical impulses may be used to gain the counting effect. The solenoid type of odometer is a common expedient and an example is shown in the U.S. Pat. 2,243,738 granted May 27, 1941, in the name of I. E. Mather.

A conventional speedometer acts against the resistance of a hair spring as in the Pat. 2,627,401 but it should be noted that in using the present invention no spring is used. Very little rotary travel of the speed cup 76 occurs and is usually less than five degrees. Counter-torque exerted on the speed cup 76 in the differential pressure build-up across the valve 68 to restrain the speed cup.

I claim:

1. A system for indicating speed comprising: a vacuum gauge, drive means to drive a permanent magnet, a speed cup around and adapted to be angularly rotated by said permanent magnet, said speed cup having a bleed valve linked thereto, the movable part of the valve being oriented relative to the valve opening so that a differential pressure across the bleed valve biasses the valve open, a vacuum source including an accumulator being connected to said bleed valve and to said vacuum gauge by conduit means through a restrictor, said accumulator having a valve therein to prevent the vacuum in the system from dropping below a given amount, upon there being a change in speed of said drive means, the speed of said permanent magnet also changes, said speed cup driven by said permanent magnet will therefore rotate an angular distance corresponding to the change in speed of said drive means and permanent magnet to change air flow through said bleed valve and conduit means to modify the vacuum to said vacuum gauge to indicate a new reading on the gauge and to provide a differential pressure build-up across said bleed valve to exert a counter torque on said speed cup, to restrain said speed cup.

2. A speed transducer system in combination with an automobile wherein said system comprises: a vacuum gauge mounted in an instrument panel of said automobile, a power transmission to drive said automobile, a modulator on said transmission connected to said vacuum gauge by conduit means through a bleed valve, a permanent magnet within said modulator driven by said power transmission, a speed cup also positioned in said modulator and adapted to be rotated an angular distance by said permanent magnet with the angular rotation being dependent upon the speed of said automobile, a source of crude vacuum, an accumulator tank between said modulator and said vacuum gauge connected by conduit means to said crude vacuum source and said modulator and vacuum guage through a restrictor, said bleed valve being linked to said speed cup and operative to admit air to the conduit means between said accumulator tank and said vacuum gauge upon there being a change in speed of said automobile, said bleed valve including a valve element which is the link to said speed cup, movable to vary a flow restrictive area therein whereby as said flow restrictive area decreases there is provided an increasing differential pressure bias on said movable valve element to change the vacuum to said vacuum gauge and thereby change the reading on said vacuum gauge, said bleed valve linked to said speed cup, further providing a counter torque, due to the differential pressure bias thereon to restrain said speed cup to prevent further rotation than that established by the speed of the permanent magnet and the relationship of the speed cup thereto, and the restrictor in said conduit effective in maintaining a vacuum in said accumulator tank greater in extent than that conduced to the gauge.

References Cited

UNITED STATES PATENTS

| | | | |
|---|---|---|---|
| 939,209 | 11/1909 | Bristol | 73—502 |
| 2,398,878 | 4/1946 | Bolli | 123—103 |
| 2,731,025 | 1/1956 | Neuman et al. | 73—519 |

JAMES J. GILL, Primary Examiner

H. GOLDSTEIN, Assistant Examiner

U.S. Cl. X.R.

73—521